US011635085B2

(12) United States Patent
Akiyama et al.

(10) Patent No.: US 11,635,085 B2
(45) Date of Patent: Apr. 25, 2023

(54) CONTROLLER OF FAN COUPLING DEVICE

(71) Applicant: TOYOTA JIDOSHA KABUSHIKI KAISHA, Toyota (JP)

(72) Inventors: Shoichi Akiyama, Toyota (JP); Noboru Takagi, Toyota (JP); Daichi Yamazaki, Toyota (JP); Masaaki Yamaguchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 133 days.

(21) Appl. No.: 17/214,117

(22) Filed: Mar. 26, 2021

(65) Prior Publication Data

US 2021/0332825 A1 Oct. 28, 2021

(30) Foreign Application Priority Data

Apr. 28, 2020 (JP) .............................. JP2020-079562

(51) Int. Cl.
*F04D 27/00* (2006.01)
*F04D 29/053* (2006.01)
*F04D 29/40* (2006.01)
*F16D 35/02* (2006.01)
*F01P 3/20* (2006.01)
*F01P 7/04* (2006.01)
*F04D 25/02* (2006.01)

(52) U.S. Cl.
CPC .............. *F04D 27/004* (2013.01); *F01P 3/20* (2013.01); *F01P 7/042* (2013.01); *F04D 25/022* (2013.01); *F04D 29/053* (2013.01); *F04D 29/403* (2013.01); *F16D 35/024* (2013.01)

(58) Field of Classification Search
CPC .... F04D 27/004; F04D 25/022; F04D 29/053; F04D 29/403; F01P 3/20; F01P 7/042; F16D 35/024
See application file for complete search history.

(56) References Cited

U.S. PATENT DOCUMENTS

| 10,669,920 | B2 | 6/2020 | Minagawa |
| 2018/0298805 | A1 | 10/2018 | Kinugawa et al. |
| 2018/0371980 | A1* | 12/2018 | Minagawa ............... F01P 5/04 |

FOREIGN PATENT DOCUMENTS

JP 2017-115701 A 6/2017

* cited by examiner

*Primary Examiner* — Grant Moubry
*Assistant Examiner* — Ruben Picon-Feliciano
(74) *Attorney, Agent, or Firm* — Finnegan, Henderson, Farabow, Garrett & Dunner, LLP

(57) ABSTRACT

A controller includes: a control unit configured to calculate a control command value of an opening degree of a solenoid valve to control an opening degree of the solenoid valve; and an acquisition unit configured to acquire an estimated amount and a target amount of a working fluid in a labyrinth chamber, and a rotation speed of a drive shaft. The control unit calculates a final control command value based on a feedback control command value and a feedforward control command value, and controls the solenoid valve, the feedback control command value being calculated based on deviation between the estimated amount and the target amount, the feedforward control command value being used to maintain a rotation speed of a fan constant based on the estimated amount and the rotation speed of the drive shaft.

5 Claims, 7 Drawing Sheets

CONTROLLER OF FAN COUPLING DEVICE

CROSS-REFERENCE TO RELATED APPLICATION

This application claims priority to Japanese Patent Application No. 2020-079562 filed on Apr. 28, 2020, incorporated herein by reference in its entirety.

BACKGROUND

1. Technical Field

The present disclosure relates to a controller of a fan coupling device.

2. Description of Related Art

A fan coupling device executes feedback control of deviation between an actual rotation speed and a target rotation speed of a fan so as to regulate the amount of working fluid in a working chamber of the fan coupling device (see, for example, Japanese Patent Application Publication No. 2017-115701).

SUMMARY

However, it is the amount of working fluid, in a labyrinth chamber which is provided in some part of the working chamber that contributes to actual rotation of the fan. Accordingly, it is conceivable to execute feedback control in accordance with deviation between the amount of working fluid in the labyrinth chamber and a target amount of the working fluid. In that case, it is desirable to accurately match the amount of working fluid with the target amount.

Under these circumstances, it is an object of the present disclosure to provide a controller of a fan coupling device, capable of accurately controlling the amount of working fluid in a labyrinth chamber.

The object can be accomplished by a controller of a fan coupling device. The fan coupling device includes a drive shaft, a rotor, a housing, a fan, a divider, a labyrinth chamber, and a solenoid valve. The drive shaft is rotationally driven. The rotor is coupled to the drive shaft. The housing is configured to house the rotor and supported so as to be rotatable relative to the rotor. The fan is fixed to the housing. The divider is configured to divide an inside of the housing into a storage chamber that stores working fluid and a working chamber that houses the rotor. The labyrinth chamber is formed between the housing and the rotor in the housing and configured to transmit rotational motive power of the rotor to the housing through the working fluid. The solenoid valve is configured to open and close a communicating port formed in the divider to regulate an amount of the working fluid in the labyrinth chamber. The controller includes: a control unit; and an acquisition unit. The control unit is configured to calculate a control command value of an opening degree of the solenoid valve to control the opening degree of the solenoid valve. The acquisition unit is configured to acquire an estimated amount and a target amount of the working fluid in the labyrinth chamber, and a rotation speed of the drive shaft. The control unit calculates a final control command value based on a feedback control command value and a feedforward control command value, and controls the solenoid valve, the feedback control command value being calculated based on deviation between the estimated amount and the target amount, the feedforward control command value being used to maintain a rotation speed of the fan constant based on the estimated amount and the rotation speed of the drive shaft.

The control unit may set the feedforward control command value such that the feedforward control command value gradually increases as the estimated amount increases in a range where the estimated amount is equal to or less than a prescribed value, and that the feedforward control command value gradually lowers as the estimated amount increases in a range where the estimated amount is larger than the prescribed value.

When the estimated amount is constant, the control unit may set the feedforward control command value such that the feedforward control command value increases as the rotation speed of the drive shaft is larger.

The acquisition unit may acquire the estimated amount by calculating the estimated amount based on the rotation speed of the drive shaft and the rotation speed of the fan in consideration of the moment of inertia of the fan and the housing.

The acquisition unit may acquire the estimated amount by calculating the estimated amount based on an engagement ratio obtained by dividing the rotation speed of the fan by the rotation speed of the drive shaft.

The present disclosure can provide a controller of a fan coupling device, capable of accurately controlling the amount of working fluid in the labyrinth chamber.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Schematic Configuration of Vehicle

Figure 1:
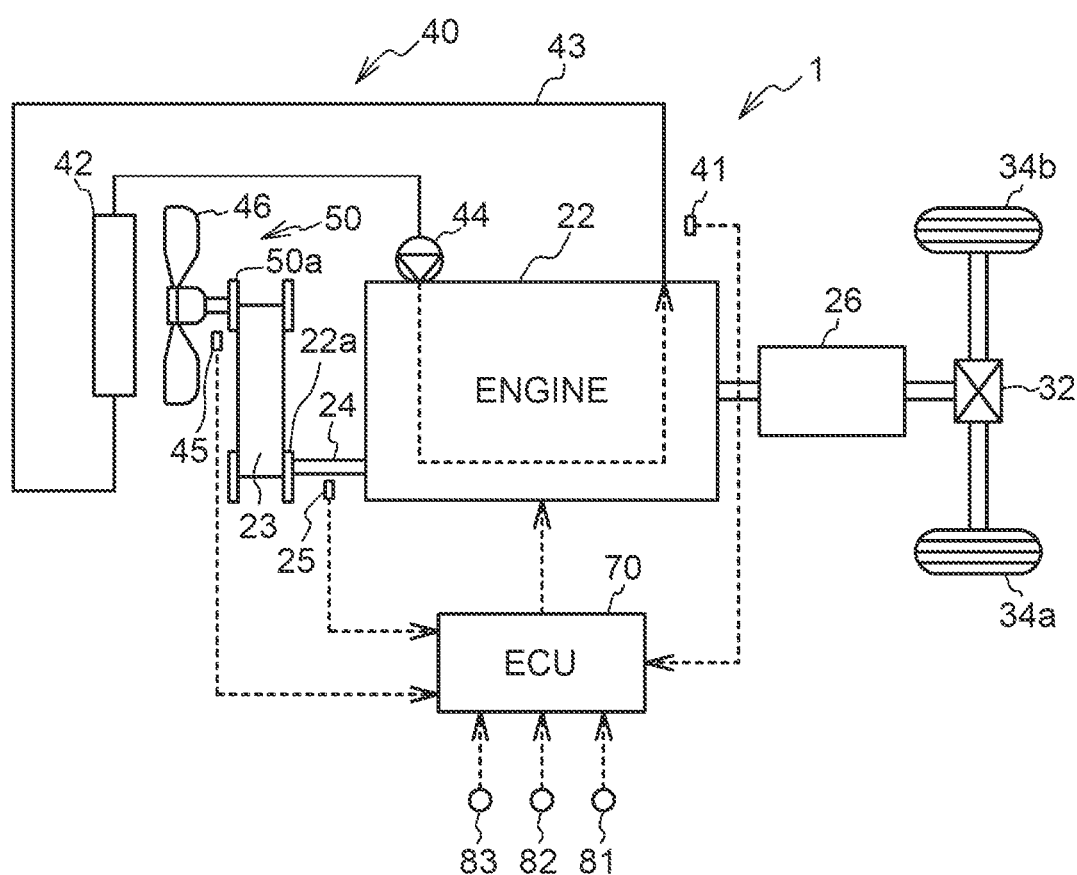
FIG. 1 shows an overall configuration of a vehicle in a present embodiment.

FIG. 1 shows an overall configuration of a vehicle 1 in the present embodiment. The vehicle 1 in the embodiment includes an engine 22, an automatic transmission 26 that changes the speed of motive power output to a crankshaft 24 from the engine 22 and transmits the motive power to wheels 34a, 34b through a differential gear 32, a cooling device 40 that cools the engine 22 using coolant with the motive power from the engine 22, and an electronic control unit (ECU) 70 that controls the entire vehicle. The engine 22 may be a gasoline engine or may be a diesel engine. The vehicle 1 may also be a hybrid vehicle.

The cooling device 40 includes a radiator 42 that performs heat exchange between the coolant of the engine 22 and ambient air, a water pump 44 driven with the motive power of the engine 22 to circulate the coolant in a circulation path 43 which connects the radiator 42 and the engine 22, and a fan 46 rotationally driven with the motive power input from the engine 22 through a fan coupling device 50.

With a belt 23 placed over a pulley 50a attached to a later-described drive shaft 51 and a pulley 22a of the engine 22, the fan coupling device 50 transmits the motive power input from the engine 22 to the fan 46 using later-described working fluid.

The ECU 70 includes a central processing unit (CPU), a random access memory (RAM), and a read only memory (ROM). The ECU 70 controls the engine 22 by executing programs stored in the RAM or ROM. The ECU 70 is also electrically connected to an ignition switch 81, a crank angle sensor 25 that detects the rotation speed of the crankshaft 24 of the engine 22, a rotation speed sensor 45 that detects the rotation speed of the fan 46, an accelerator pedal position sensor 82 that detects an accelerator operation amount, a vehicle speed sensor 83 that detects a vehicle speed, and a coolant temperature sensor 41 that detects an outlet temperature of the coolant. As described later in detail, the ECU 70 controls the later-described solenoid valve 60 with use of an acquisition unit and a control unit that are functionally implemented by the CPU, the RAM, and the ROM.

Configuration of Fan Coupling Device

Figure 2:
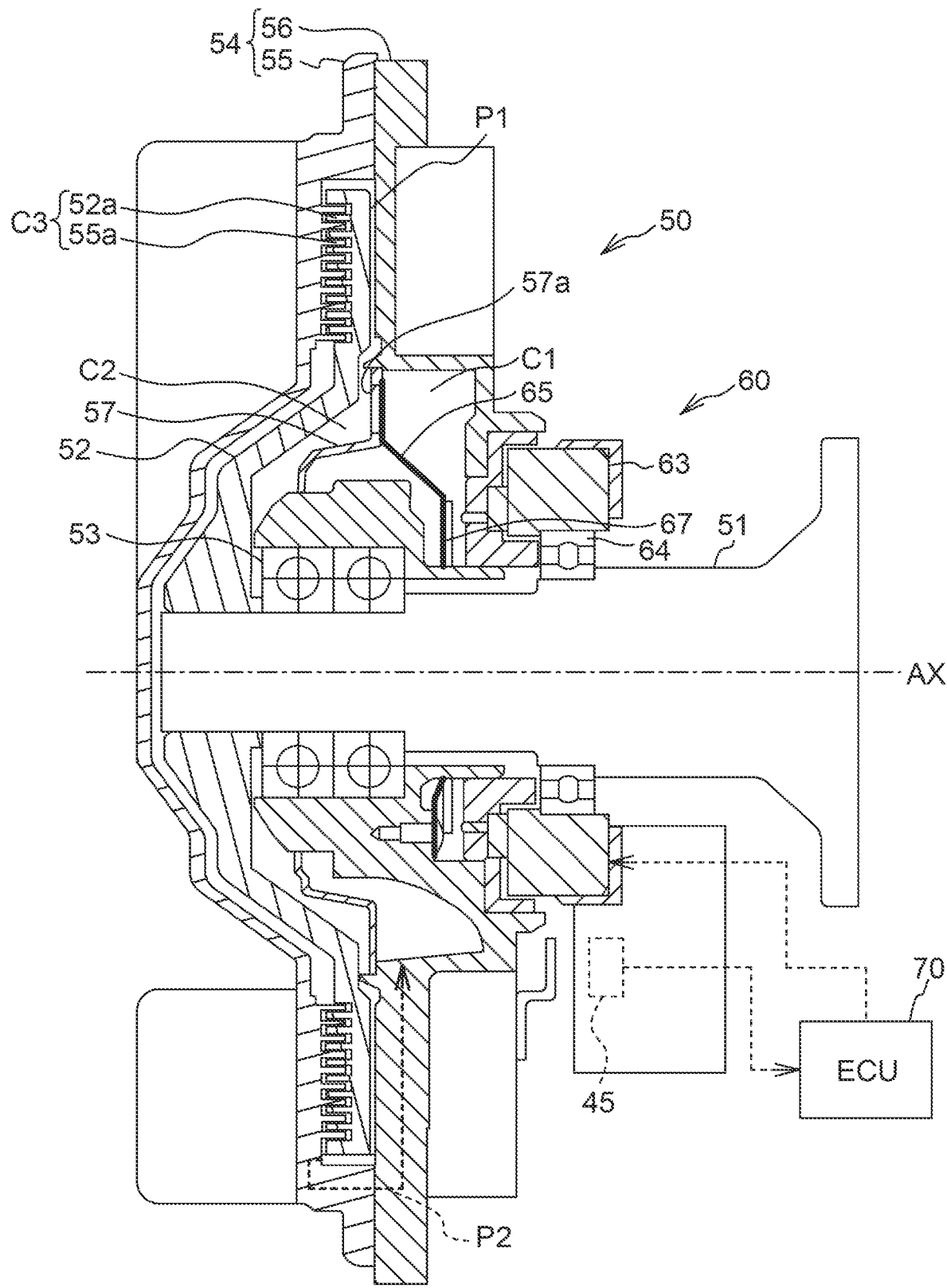
FIG. 2 is a sectional view of a fan coupling device.

FIG. 2 is a sectional view of the fan coupling device 50. The fan coupling device 50 includes the drive shaft 51, a rotor 52, a housing 54, a divider 57, and the solenoid valve 60. In the housing 54, silicone oil with a high viscosity is enclosed as working fluid, for example. Henceforth, the working fluid is referred to as hydraulic oil.

Between the drive shaft 51 and the housing 54, two bearings 53 are provided. Fixed to a distal-end portion of the drive shaft 51 is the rotor 52 having an approximately disc-shape. Fixed to a base end portion of the drive shaft 51 is the pulley 50a shown in FIG. 1. The drive shaft 51 and the rotor 52 rotate when the rotational motive power of the crankshaft 24 shown in FIG. 1 is transmitted through the belt 23 and the pulley 50a. In FIG. 2, a center axis line AX of the drive shaft 51 is illustrated.

The housing 54 includes a cover portion 55 and a body portion 56 which are fixed to each other. The cover portion 55 is located on the distal-end side of the drive shaft 51, and the body portion 56 is located closer to the proximal-end side of the drive shaft 51 than the cover portion 55. The drive shaft 51 is held so as to be rotatable relative to the body portion 56 through the bearing 53. The fan 46 not shown in FIG. 2 is provided in an outer peripheral portion of the housing 54. On a back surface side of the body portion 56, the rotation speed sensor 45 is provided to detect the rotation speed of the body portion 56 which rotates integrally with the fan 46.

The inside of the housing 54 is divided by the divider 57 into a storage chamber C1 and a working chamber C2. The storage chamber C1 is provided on the side of the body portion 56. The working chamber C2 is provided on the side of the cover portion 55. The divider 57 has a communicating port 57a provided so as to communicate with the storage chamber C1 and the working chamber C2.

The rotor 52 is housed in the working chamber C2. The rotor 52 has a plurality of ribs 52a provided in a concentric circular shape. Similarly, on the inner side of the cover portion 55, a plurality of ribs 55a is provided in a concentric circular shape. When these ribs 52a and 55a gear each other, a labyrinth chamber C3 which is space like a labyrinth is formed.

Between the back surface side of the rotor 52 and the inner side of the body portion 56, a supply passage P1 is formed so as to connect the central side and the outer peripheral side of the rotor 52. On the opposite side of the central portion of the rotor 52 from the supply passage P1 in FIG. 2, a collection passage P2 is formed so as to extend from the inside of the cover portion 55 to the storage chamber C1 through the cover portion 55 and the body portion 56. The hydraulic oil discharged from the labyrinth chamber C3 flows into the storage chamber C1 through the collection passage P2.

The solenoid valve 60 regulates the oil amount in the labyrinth chamber C3. The solenoid valve 60 includes an electromagnet 63, a valve body 65, and an armature 67. The valve body 65 is a plate-shaped member made of an elastically deformable metal. The valve body 65 is fixed at its base end portion to the body portion 56 with a screw. The armature 67 is fixed to the surface of the valve body 65 on the side of the electromagnet 63. The armature 67 is biased with a spring, which is not shown, toward the divider 57. Thus, the distal-end portion of the valve body 65 closes the communicating port 57a.

The ECU 70 controls energizing and non-energizing of the electromagnet 63. When the electromagnet 63 is in a non-energized state, the distal-end portion of the valve body 65 closes the communicating port 57a as described above. When the electromagnet 63 is energized, the armature 67 is magnetically attracted toward the electromagnet 63, and the distal-end portion of the valve body 65 is elastically deformed so as to be separated from the communicating port 57a against the biasing force of the spring described above. Here, the ECU 70 controls energizing and non-energizing of the electromagnet 63 through pulse width modulation (PWM) control. More specifically, the ECU 70 can regulate the opening degree of the valve body 65 by regulating duty of drive voltage applied to the electromagnet 63.

The electromagnet 63, which is formed in an annular shape, is provided in the state of being inserted into the drive shaft 51. The electromagnet 63 is fixed to the vehicle mounted with an internal combustion engine, the internal combustion engine itself, or other auxiliary machines. Between the drive shaft 51 and the electromagnet 63, a bearing 64 is disposed. Since the drive shaft 51 and the electromagnet 63 can rotate in a relative manner, the drive shaft 51 can rotate while the electromagnet 63 is fixed to the vehicle or the like.

When the electromagnet 63 is energized and the valve body 65 opens the communicating port 57a, the hydraulic oil is supplied to the working chamber C2 from the storage chamber C1, and is supplied to the labyrinth chamber C3 through the supply passage P1. Due to viscous resistance of the hydraulic oil in the labyrinth chamber C3, the rotation torque of the rotor 52 is transmitted to the housing 54, and thereby the housing 54 and the fan 46 rotate. As a consequence, the rotation speed of cooling air sucked into the radiator 42 increases even with the vehicle rotation speed unchanged, so that the amount of heat radiation from the radiator 42 increases. When the amount of heat radiation from the radiator 42 increases, the temperature of coolant changes to be lower. The hydraulic oil discharged from the labyrinth chamber C3 is collected into the storage chamber C1 through the collection passage P2. In the state where the communicating port 57a is open, the hydraulic oil collected into the storage chamber C1 is again supplied to the working chamber C2.

When the electromagnet 63 is put in the non-energized state and the valve body 65 closes the communicating port 57a, the hydraulic oil discharged from the labyrinth chamber C3 is collected into the storage chamber C1, and supply of the hydraulic oil to the working chamber C2 is stopped. When the hydraulic oil is completely discharged from the labyrinth chamber C3, the rotation torque of the rotor 52 is not transmitted to the housing 54, and only the rotor 52 rotates. This means that the fan 46 stops its rotation.

The ECU 70 can also control the opening degree of the solenoid valve 60 through PWM control on the electromagnet 63. Specifically, as the ECU 70 applies drive voltage to the electromagnet 63 at a higher control duty, the opening degree of the valve body 65 becomes larger. Such control of the opening degree of the solenoid valve 60 makes it possible to control the oil amount in the labyrinth chamber C3, and to thereby control the rotation speed of the housing 54 and the fan 46. For example, in consideration of the temperature of the coolant detected by the coolant temperature sensor 41, the ECU 70 controls the opening degree of the solenoid valve 60 such that the fan 46 rotates at desired rotation speed.

Control Method of Oil Amount in C3

As described later in detail, the ECU 70 estimates the amount of hydraulic oil (hereinafter, referred to as estimated oil amount) in the labyrinth chamber C3 all the time, subtracts from the estimated oil amount a target oil amount to obtain an oil amount deviation, and performs feedback calculation of the oil amount deviation to obtain a feedback control duty (hereinafter, referred to as FBduty). The ECU 70 adds to the obtained feedback control duty a feedforward control duty (hereinafter, referred to as FFduty) obtained by feedforward calculation described later in detail to calculate a final control duty. Based on the final control duty, the ECU 70 drives the electromagnet 63 to control the opening degree of the solenoid valve 60. Thus, the ECU 70 converges the estimated oil amount to the target oil amount.

Here, it is conceivable to control the opening degree of the solenoid valve 60 by using only FBduty as the final control duty, without adding FFduty to FBduty. However, in such a case, following problems arise.

Figure 3:
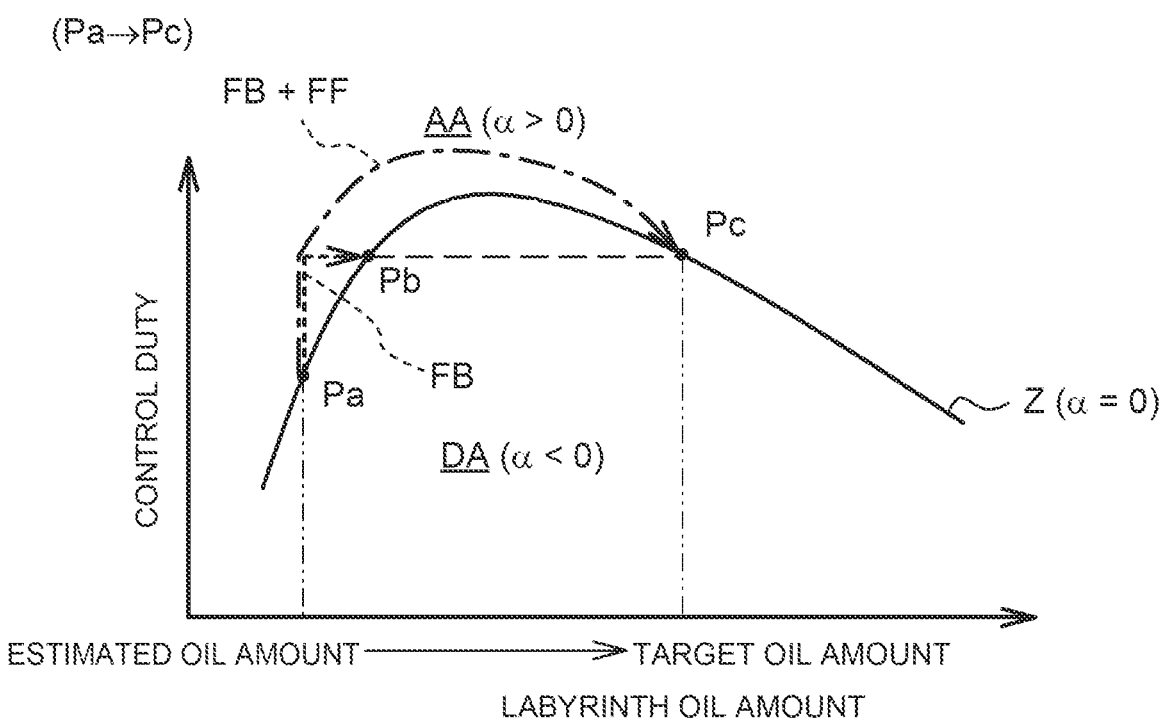
FIG. 3 is a graph indicating the relationship between control duty, an oil amount in a labyrinth chamber, and an acceleration of a fan.

FIG. 3 is a graph indicating the relationship between the control duty, the oil amount in the labyrinth chamber C3, and the acceleration of the fan 46. A vertical axis represents the control duty, and the horizontal axis represents the oil amount in the labyrinth chamber C3. In FIG. 3, a constant-rotation speed line Z indicates the fan 46 having a rotation acceleration of zero and rotating at fixed rotation speed while the drive shaft 51 rotating at fixed rotation speed, and the constant-rotation speed line Z separates an acceleration area AA and a deceleration area DA. In the acceleration area AA, the control duty is larger than that on the constant-rotation speed line Z, and an acceleration α of the fan 46 is larger than zero, i.e., the fan 46 accelerates. In the deceleration area DA, the control duty is smaller than that on the constant-rotation speed line Z, and the acceleration α of the fan 46 is less than zero, i.e., the fan 46 decelerates.

As shown by the constant-rotation speed line Z of FIG. 3, the control duty which can maintain the acceleration of the fan 46 α to zero is different depending on the oil amount in the labyrinth chamber C3. Specifically, in the range where the oil amount is less than a prescribed value, the oil amount increases as the control duty which can maintain the acceleration α to zero increases. However, in the range where the oil amount is more than the prescribed value, the oil amount increases as the control duty which can maintain the acceleration α to zero reduces. In other words, in the range where the oil amount is relatively small, the oil amount increases as the opening degree of the solenoid valve 60, which can maintain the acceleration α to zero, increases. However, in the range where the oil amount is relatively large, the oil amount increases as the opening degree of the solenoid valve 60 lowers. This may be mainly because the oil amount in the storage chamber C1 reduces as the oil amount in the labyrinth chamber C3 increases, or because rotation speed difference between the drive shaft 51 and the fan 46 becomes smaller and the amount of oil collected into the storage chamber C1 lowers as the oil amount in the labyrinth chamber C3 increases to a prescribed value or more.

Here, assume the case where the estimated oil amount shown in FIG. 3 is used as a current value, and the estimated oil amount is converged into a target oil amount. To converge the estimated oil amount to the target oil amount, it is necessary to match the estimated oil amount with the target oil amount, and maintain the fan 46 at fixed rotation speed, i.e., to maintain the acceleration a of the fan 46 to zero. Therefore, description is given of the case where a point Pa that is an operating point indicating the estimated oil amount on the constant-rotation speed line Z is shifted to a point Pc that is an operating point indicating the target oil amount on the constant-rotation speed line Z.

In FIG. 3, "FB" represents a moving track of the operating point in the case where only FBduty is used as the control duty. As shown by the moving track "FB", the control duty is controlled to the value corresponding to the point Pc. Consequently, the operating point increases from the point Pa up to the region of the acceleration area AA, so that the fan 46 accelerates. Then, as the estimated oil amount (current oil amount) gradually increases, the acceleration α of the fan 46 gradually lowers. Thus, the operating point shifts to a point Pb on the constant-rotation speed line Z. In the point Pb, the control duty is the same as that of the point Pc, but the oil amount is smaller than the target oil amount. Since the point Pb is on the constant-rotation speed line Z, and so the acceleration α is zero, it may become difficult for the operating point to shift from the point Pb to the point Pc. In other words, there are cases where the oil amount in the labyrinth chamber C3 is not converged into the target oil amount even though the feedback control on the oil amount deviation is performed as described above.

As a solution, in the present embodiment, the ECU 70 calculates a final control duty by adding FFduty duty that is a duty set depending on the oil amount and corresponding to the constant-rotation speed line Z to FBduty as described before. Based on the calculated final control duty, the ECU 70 controls the opening degree of the solenoid valve 60. In FIG. 3, "FB+FF" represents a moving track of the operating point in the case where a value obtained by adding FFduty to FBduty is used as the final control duty. As indicated by the moving track "FB+FF", when shifting from the point Pa to the point Pc, the operating point can shift to the point Pc by passing through a region where the acceleration α is larger, by a portion of FBduty based on FFduty, than the constant-rotation speed line Z. Thus, it is possible to converge the estimated oil amount to the target oil amount.

Control Method of Fan Coupling Device

Figure 4:
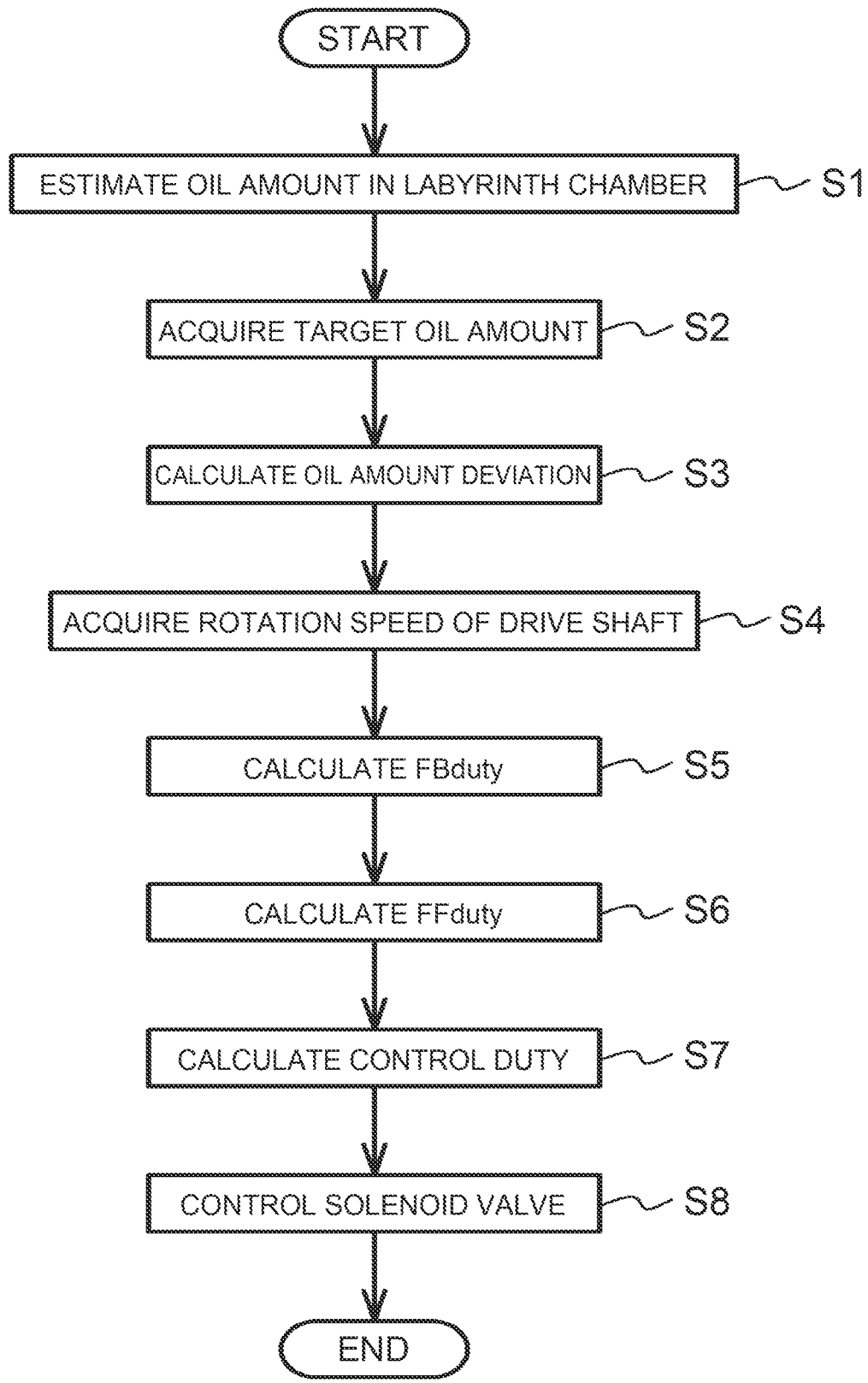
FIG. 4 is a flowchart showing an example of a control method of a fan coupling device executed by an ECU.

FIG. 4 is a flowchart showing an example of a control method of the fan coupling device 50 executed by the ECU 70. The control is repeatedly executed while the engine 22 is driven. The ECU 70 estimates the oil amount that is the amount of oil in the labyrinth chamber C3 (step S1). A specific estimation method will be described later. Next, the ECU 70 acquires a target oil amount that is a target value of the amount of oil in the labyrinth chamber C3 (step S2). The target oil amount is calculated from a target engagement ratio. The target engagement ratio is set in consideration of the rotation speed of the crankshaft 24, the vehicle speed, the temperature of coolant, or other parameters such as a set temperature of an air-conditioner of the vehicle 1. Next, the ECU 70 calculates an oil amount deviation obtained by subtracting the target oil amount [m$^3$] from the estimated oil amount [m$^3$] (step S3).

Next, the ECU 70 acquires the rotation speed of the drive shaft 51 (step S4). Specifically, the ECU 70 acquires the rotation speed [rpm] of the drive shaft 51 based on the rotation speed of the crankshaft 24 acquired by the crank angle sensor 25 and a diameter ratio between the pulley 22*a* and the pulley 50*a*. Steps S1 to S4 are examples of the processes executed by the acquisition unit.

Next, the ECU 70 calculates FBduty for carrying out feedback control of the oil amount deviation (step S5). The feedback control may be, for example, PI control. However, without being limited to PI control, the feedback control may be PID control, and may be P control.

Figure 5:
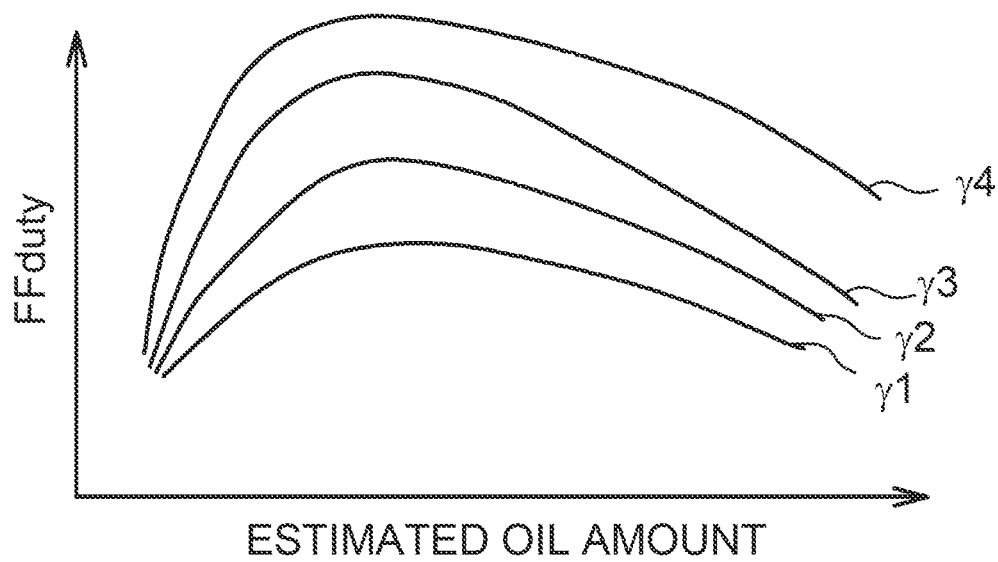
FIG. 5 is an example of a map showing regions where PI control or P control is executed in accordance with the rotation speed of the drive shaft and an estimated oil amount.

The ECU 70 further calculates FFduty for carrying out feedforward control based on the rotation speed of the drive shaft 51 and the estimated oil amount with reference to a map of FIG. 5 (step S6). In FIG. 5, a horizontal axis represents the estimated oil amount, and the vertical axis represents FFduty. FIG. 5 illustrates rotation speeds γ1 to γ4 of the drive shaft 51. The rotation speed of the drive shaft 51 is faster in order of the rotation speeds γ1 to γ4. FFduty corresponds to the constant-rotation speed line Z shown in FIG. 3. For example, in the example of FIGS. 3 and 5, the rotation speed γ3 of FIG. 5 is equal to the constant-rotation speed line Z of FIG. 3. Therefore, when the rotation speed of the drive shaft 51 is γ3, FFduty corresponding to the estimated oil amount obtained with reference to FIG. 5 is calculated. In the map of FIG. 5, FFduty is defined to be larger, as the rotation speed of the drive shaft 51 is faster on the condition that the oil amount is unchanged. The map of FIG. 5 is acquired by experiments or the like in advance, and stored in the ROM of the ECU 70. The estimated oil amount when FFduty is maximal may be different in accordance with the rotation speed of the drive shaft 51.

Next, the ECU 70 calculates a duty obtained by adding FFduty to FBduty as the final control duty (step S7), and controls the solenoid valve 60 based on the final control duty (step S8). Thus, the oil amount in the labyrinth chamber C3 can accurately be controlled. Steps S5 to S8 are examples of the processes executed by the control unit.

Other Examples in Case of Converging Estimated Oil Amount to Target Oil Amount

Figure 6A:
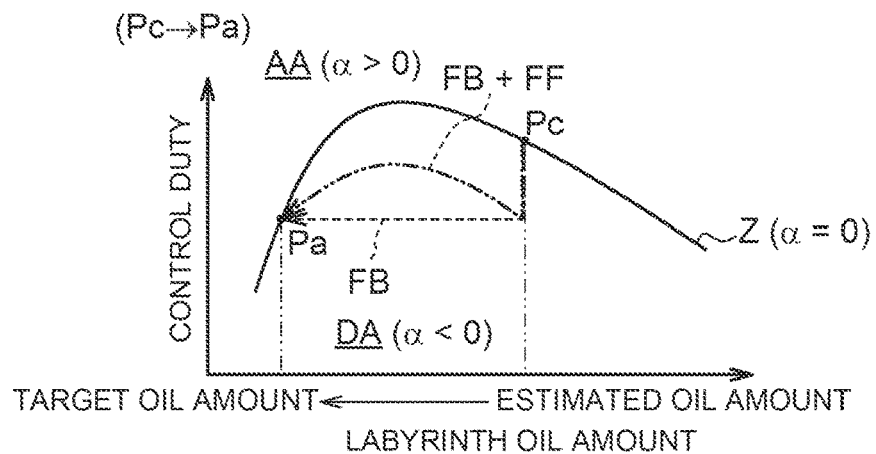
FIG. 6A is a graph illustrating the case of converging the estimated oil amount to a target oil amount.
Figure 6B:
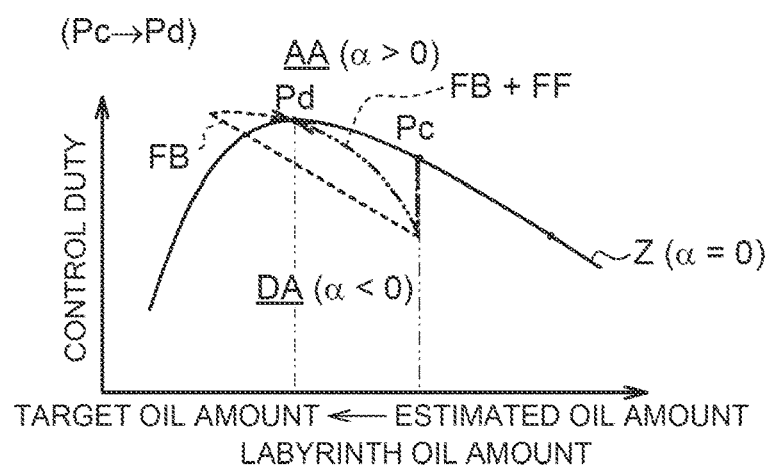
FIG. 6B is a graph illustrating the case of converging the estimated oil amount to the target oil amount.
Figure 6C:
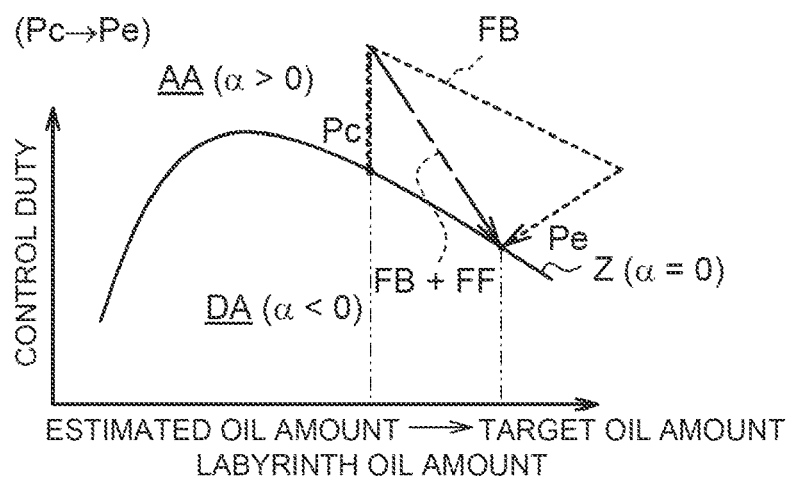
FIG. 6C is a graph illustrating the case of converging the estimated oil amount to the target oil amount.

Description is now given of difference between "FB" and "FB+FF" in the case of converging the estimated oil amount to the target oil amount other than the case shown in FIG. 3. FIGS. 6A to 6C are graphs illustrating the case of converging the estimated oil amount to the target oil amount. FIG. 6A shows the case where the target oil amount is less than the estimated oil amount. Description is given of the case where the operating point is shifted from a point Pc to a point Pa shown in FIG. 6A. As shown by a moving track "FB", the control duty is first controlled to the value corresponding to the point Pa. Consequently, the operating point lowers from the point Pc to the region of the deceleration area DA, so that the fan 46 decelerates. Then, the estimated oil amount gradually lowers, and the operating point reaches the point Pa on the constant-rotation speed line Z.

As indicated by a moving track "FB+FF", the control duty is controlled to the value corresponding to the point Pa, and the operating point lowers from the point Pc. However, since a portion corresponding to FBduty is added based on FFduty, the operating point can shift to the point Pa through an area where the acceleration α is smaller than that in the case of "FB" in the deceleration area DA. In this case, even when only FBduty is used as the control duty, the operating point can shift from the point Pc to point Pa.

FIG. 6B shows the case where the target oil amount is less than the estimated oil amount, although the control duty, with which the acceleration α at the target oil amount is zero, is larger than the current control duty. Description is given of the case where the operating point is shifted from a point Pc to a point Pd shown in FIG. 6B. In this case, as shown by a moving track "FB", the control duty once lowers from the point Pc to a prescribed value, and then the oil amount gradually lowers as the control duty becomes larger. The oil amount then becomes lower than the target oil amount in the deceleration area DA, and the operating point moves to the acceleration area AA. In the acceleration area AA, the control duty lowers again. Consequently, the oil amount also lowers and the operating point reaches the point Pd.

In contrast, as shown by a moving track "FB+FF", the control duty once lowers from the point Pc to the prescribed value. Then, the control duty becomes larger than that in the case of using only FBduty, and the operating point reaches the point Pd in the deceleration area. DA. Thus, in the present embodiment, the estimated oil amount can be made to reach the target oil amount in a short time, and excellent responsiveness can be achieved.

FIG. 6C shows the case where the target oil amount is more than the estimated oil amount, although the control duty, with which the acceleration α at the target oil amount is zero, is smaller than the current control duty. Description is given of the case where the operating point is shifted from a point Pc to a point Pe shown in FIG. 6C. As shown by a moving track "FB", the control duty once rises from the point Pc to a prescribed value. As the control duty lowers, the oil amount gradually increases until it exceeds the target oil amount. Then, integral control is performed as the feedback control to regulate the control duty so as to lower the oil amount. Thus, the operating point reaches the point Pe.

In contrast, as shown by a moving track "FB+FF", the control duty once rises from the point Pc to the prescribed value. Then, the control duty becomes considerably lower than that in the case of using only FBduty. As the oil amount gradually increases, the operating point reaches the point Pe. Also in this case, in the present embodiment, the estimated oil amount can be made to reach the target oil amount in a short time, and excellent responsiveness can be achieved. As described in the foregoing, according to control of the present embodiment, the oil amount in the labyrinth chamber C3 can accurately be controlled, and excellent responsiveness is further achieved.

Calculation Method of Estimated Oil Amount

Description is now given of a calculation method of the estimated oil amount described above by using numerical expressions.

$$T_{fric} = L \times \frac{\mu}{h} UA \quad (1)$$

-continued $$= L \times \frac{\mu}{h} \{L(\omega_{in} - \omega_{fan})\} A$$

$$= \frac{\mu}{h} (\omega_{in} - \omega_{fan}) \cdot f(Q_{oil})$$

A transmission torque $T_{fric}$ [N·m] represents a transmission torque transmitted to the housing 54 and the fan 46 from the drive shaft 51 by the fan coupling device 50. An immersed surface rotation radius L [m] represents the rotation radius of an immersed surface which is a distance of a region of the labyrinth chamber C3 immersed with hydraulic oil from the center axis line AX. A coefficient of viscosity $\mu$ [Pa·s] represents the coefficient of viscosity of hydraulic oil. The coefficient of viscosity $\mu$ takes a value predetermined in accordance with the type of hydraulic oil. A gap representative value h[m] represents a representative value of a gap of the labyrinth chamber C3, i.e., a gap between the rib 52a and the rib 55a. The gap representative value takes a predetermined value. A peripheral rotation speed difference U [m/s] represents a difference between a peripheral rotation speed of the outer periphery of the rotor 52 and a peripheral rotation speed of the inner periphery of the housing 54. An immersion area A [m$^2$] represents the area of a region of the labyrinth chamber C3 immersed with hydraulic oil. An angular rotation speed $\omega_{in}$ [rad/s] represents the angular rotation speed of the drive shaft 51. An angular rotation speed $\omega_{in}$ [rad/s] represents the angular rotation speed of the fan 46. A term f ($Q_{oil}$) represents the product [m$^4$] of the immersion area A and the square of the immersed surface rotation radius L. An oil amount $Q_{oil}$ [m$^3$] represents the amount of hydraulic oil in the labyrinth chamber C3.

The expression (1) can be deformed into an expression (2) and expression (3).

$$f(Q_{oil}) = \frac{h}{\mu} \cdot \frac{T_{fric}}{\omega_{in} - \omega_{fan}} \quad (2)$$

$$Q_{oil} = f^{-1}\left(\frac{T_{fric}}{\omega_{in} - \omega_{fan}} \cdot \frac{h}{\mu}\right) \quad (3)$$

$$\equiv g\left(\frac{T_{fric}}{\omega_{in} - \omega_{fan}}\right)$$

In the expression (3), g represents a function. A term g $\{T_{fric}/(\omega_{in}-\omega_{fan})\}$ represents the oil amount [m$^3$] with which the transmission torque $T_{fric}$ can be obtained at $(\omega_{in}-\omega_{fan})$.

Following expressions are also established.

$$T_{fric} = T_{drag} + T_{inert} \quad (4)$$

$$T_{drag} = k_{drag} \omega_{fan}^2 \quad (5)$$

$$T_{inert} = I_{fan} \dot{\omega}_{fan} \quad (6)$$

A drag load torque $T_{drag}$ [N·m] represents the drag load torque acting on the housing 54 and the fan 46. An inertial load torque $T_{inert}$ [N·m] represents the inertial load torque acting on the housing 54 and the fan 46. A drag calculation coefficient $k_{drag}$ [(N·m)/(rad/s)$^2$] is a predetermined value. An inertia moment $I_{fan}$ [kg·m$^2$] represents the inertia moment of the housing 54 and the fan 46 which rotate integrally. An angular acceleration $\omega_{fan}'$ [rad/s$^2$] represents the angular acceleration of the fan 46. According to the above, the expression (3) can be expressed as below:

$$\therefore Q_{oil} = g\left(\frac{k_{drag} \omega_{fan}^2 + I_{fan} \dot{\omega}_{fan}}{\omega_{in} - \omega_{fan}}\right) \quad (7)$$

Since the angular speed $\omega_{in}$ is the angular speed of the drive shaft 51, it can be calculated based on the rotation speed of the crankshaft 24 detected by the crank angle sensor 25 and a ratio between the diameters of the pulleys 22a, 50a. The angular speed $\omega_{fan}$ is the angular speed of the fan 46, and the angular acceleration $\omega_{fan}'$ can be obtained by time-differentiating the angular speed of the fan 46. Accordingly, the angular acceleration $\omega_{fan}'$ can be calculated from the rotation speed of the fan 46 detected by the speed sensor 45. The drag calculation coefficient $k_{drag}$ is stored in advance in the ROM of the ECU 70. Similarly, the function g is stored in advance in the ROM of the ECU 70 as a map. However, the function g may also be stored as an operation expression.

As shown in the expression (3), the gap representative value h and the immersed surface rotation radius L are reflected on the function g. As shown in the expression (7), the oil amount $Q_{oil}$ is calculated in consideration of the inertial load torque $T_{inert}$ and the drag load torque $T_{drag}$. Accordingly, the oil amount in the labyrinth chamber C3 can accurately be estimated. Therefore, in the case of performing various control using the estimated value, the control can accurately be executed.

In the expression (7), the angular acceleration $\omega_{fan}'$ may be smoothed, and then the oil amount $Q_{oil}$ may be calculated. When the inertia moment $I_{fan}$ of the housing 54 and the fan 46 is extremely small, and therefore the inertial load torque $T_{inert}$ is ignorable, the oil amount $Q_{oil}$ may be calculated by setting the inertia moment $I_{fan}$ to zero in the expression (7).

Figure 7:
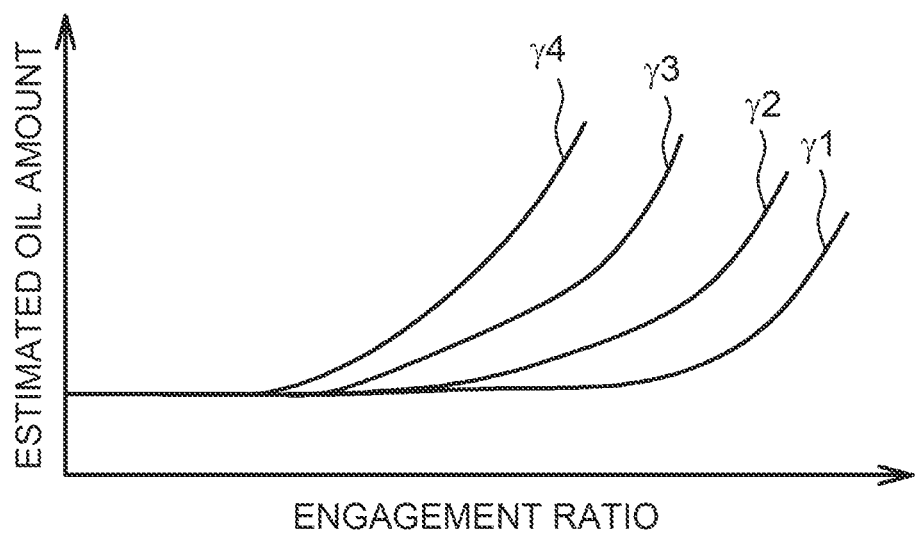
FIG. 7 is an example of a map that defines the relationship between an engagement ratio and the estimated oil amount.

The estimated oil amount may also be calculated as follows. FIG. 7 is an example of a map that defines the relationship between the engagement ratio and the estimated oil amount. The map is defined based on an experimental result or the like, and is stored in the ROM of the ECU 70. The engagement ratio can be calculated by dividing the rotation speed of the rotor 52 by the rotation speed of the housing 54 and the fan 46 as described before. The rotation speed of the rotor 52 is the rotation speed of the drive shaft 51. The rotation speed of the drive shaft 51 can be calculated based on the rotation speed of the crankshaft 24 detected by the crank angle sensor 25 and on the ratio between the diameters of the pulleys 22a, 50a. The rotation speeds γ1 to γ4 of the drive shaft 51 are larger in this order. Thus, the estimated oil amount may be calculated based on the engagement ratio and the rotation speed of the drive shaft 51 with reference to the map of FIG. 7.

Although the embodiment of the present disclosure has been described in detail, the applicable embodiment is not limited to such specific embodiments. Various modifications and changes may be made without departing from the scope of the present disclosure.

What is claimed is:

1. A controller of a fan coupling device, the fan coupling device including a drive shaft that is rotationally driven, a rotor coupled to the drive shaft, a housing configured to house the rotor and supported so as to be rotatable relative to the rotor, a fan fixed to the housing, a divider configured to divide an inside of the housing into a storage chamber that stores working fluid and a working chamber that houses the rotor, a labyrinth chamber formed between the housing and the rotor in the housing and configured to transmit rotational motive power of the rotor to the housing through the working fluid, and a solenoid valve configured to open and close a communicating port formed in the divider to regulate an amount of the working fluid in the labyrinth chamber, the controller comprising a processor configured to:

acquire an estimated amount and a target amount of the working fluid in the labyrinth chamber, and a rotation speed of the drive shaft;

calculate a control command value of an opening degree of the solenoid valve, the control command value being calculated based on a feedback control command value and a feedforward control command value, the feedback control command value being calculated based on deviation between the estimated amount and the target amount, the feedforward control command value being used to maintain a rotation speed of the fan constant based on the estimated amount and the rotation speed of the drive shaft; and control the solenoid valve using the control command value.

2. The controller according to claim 1, wherein the processor is configured to set the feedforward control command value such that the feedforward control command value gradually increases as the estimated amount increases in a range where the estimated amount is equal to or less than a prescribed value and that the feedforward control command value gradually lowers as the estimated amount increases in a range where the estimated amount is larger than the prescribed value.

3. The controller according to claim 1, wherein when the estimated amount is constant, the processor is configured to set the feedforward control command value such that the feedforward control command value increases as the rotation speed of the drive shaft is larger.

4. The controller according to claim 1, wherein the processor is configured to acquire the estimated amount by calculating the estimated amount based on the rotation speed of the drive shaft and the rotation speed of the fan in consideration of moment of inertia of the fan and the housing.

5. The controller according to claim 1, wherein the processor is configured to acquire the estimated amount by calculating the estimated amount based on an engagement ratio obtained by dividing the rotation speed of the fan by the rotation speed of the drive shaft.

* * * * *